Dec. 14, 1965          E. J. HAMMER          3,223,455
MOUNTING MEANS FOR AUXILIARY WHEELS
Filed July 30, 1964                    2 Sheets-Sheet 1

INVENTOR.
ERVIN J. HAMMER
BY Owen + Owen
ATTORNEYS

Dec. 14, 1965   E. J. HAMMER   3,223,455
MOUNTING MEANS FOR AUXILIARY WHEELS
Filed July 30, 1964   2 Sheets-Sheet 2

INVENTOR.
ERVIN J. HAMMER
BY *Owen & Owen*
ATTORNEYS

United States Patent Office 3,223,455
Patented Dec. 14, 1965

3,223,455
MOUNTING MEANS FOR AUXILIARY WHEELS
Ervin J. Hammer, Miller City, Ohio, assignor to Hammer and Gump, Miller City, Ohio, a partnership
Filed July 30, 1964, Ser. No. 386,312
4 Claims. (Cl. 301—36)

This invention relates to mounting means for auxiliary wheels and more particularly to means for attaching and detaching auxiliary traction wheels to rear wheels of tractors.

Various mounting arrangements for auxiliary traction wheels have heretofore been known, but have been generally unsatisfactory. The main deficiency in these mounts is that an excessive amount of time is required to attach and remove the auxiliary wheels. This has resulted because a number of bolts and nuts have been employed to attach the auxiliary wheels, and all of the bolts and nuts have had to be affixed or removed before the auxiliary wheel could be mounted or removed. Also, the mounting arrangements heretofore known were tailor-made for each type of tractor wheel, thus requiring that a large number of types of mounting arrangements be manufactured and kept in stock to accommodate a large number of types and sizes of wheels.

The present invention relates to mounting means for auxiliary wheels which enable auxiliary wheels to be attached to and removed from the main wheels of a tractor in a matter of minutes. The new mounting arrangement also can be used for a variety of wheels so that a minimum number of sizes and styles of auxiliary wheels need be made and stocked.

It is, therefore, a principal object of the invention to provide improved mounting means for quickly attaching and detaching auxiliary wheels to the rear wheels of a tractor or the like.

Another object of the invention is to provide improved mounting means of the character described which are suitable for use with a number of types of wheels.

Other objects and advantages of the invention will be apparent from the following detailed description of a preferred embodiment thereof, reference being made to the accompanying drawing, in which.

Figure 1:
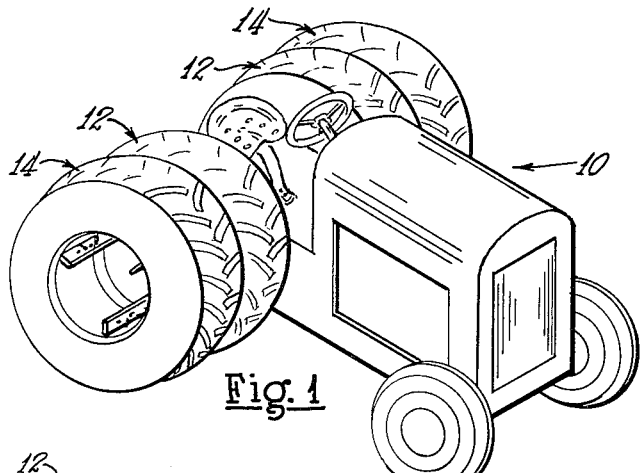
FIG. 1 is a somewhat schematic view in perspective of a tractor employing auxiliary traction wheels according to the invention.

Referring to the drawings and particularly to FIG. 1, a tractor 10 is shown with main rear wheels 12 and auxiliary traction wheels 14. Frequently, the pulling capacity of a tractor is not limited by lack of power but by lack of traction. In such an instance, the auxiliary traction wheels 14 are very effective in providing the necessary additional traction and thereby increase the pulling capacity. Because the auxiliary traction wheels are used only periodically, it is important that they can be mounted on or attached to the main wheels 12 and removed therefrom in a reasonable amount of time. If the means of attachment and removal requires too much time, the auxiliary wheels simply will not be used at all when they should be employed, or else will be left on during times when they are not required. In the latter instance, additional tire wear results, greater friction is involved, and operation of the tractor is more cumbersome, without any benefits being achieved.

Figure 2:
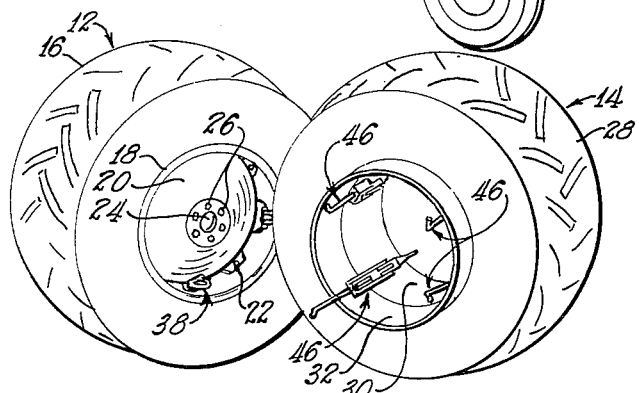
FIG. 2 is a view in perspective on an enlarged scale of a main tractor wheel and an auxiliary traction wheel about to be attached by mounting means according to the invention.
Figure 3:
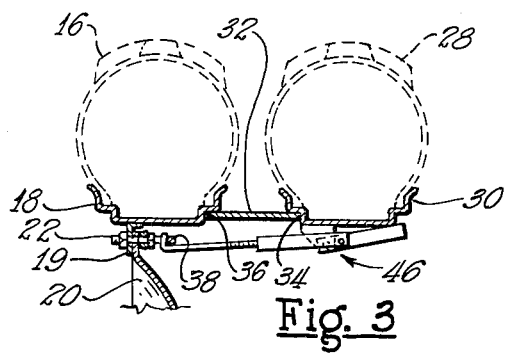
FIG. 3 is an enlarged, fragmentary view in transverse cross section taken through the main wheel and the auxiliary wheel when mounted thereon.

Referring more particularly to FIG. 2, each of the main tractor wheels 12 includes a large tire 16 mounted on a main tire rim 18 which has a flange 19 (FIG. 3) affixed to a wheel hub 20 by a plurality of lugs or bolts 22 spaced uniformly around the periphery of the hub 20. The rim 18 is ordinarily affixed to the hub 20 by either six or eight of the lugs 22, depending upon the style of the wheel. The hub 20, in turn, can be affixed to a main axle 24 by bolts 26 in the usual manner.

The auxiliary traction wheel 14 includes a second tire 28 and a second rim 30 which can be similar to the first rim 18 except that the rim 30 requires no flange portion for attachment to the hub 20. A spacing band 32 is located between the rims 18 and 30 when the auxiliary wheel is mounted on the main wheel, with the band 32 preferably welded to an offset portion 34 (FIG. 3) of the rim 30 and abutting a similar offset portion 36 of the rim 18. It is not essential that the spacing band 32 be welded to the auxiliary rim 30, although it facilitates assembly, since the band will be clamped tightly between the offset rim portions 34 and 36 when the two wheels are fully assembled.

Figure 7:
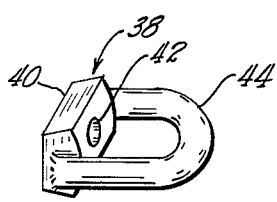
FIG. 7 is an enlarged view in perspective of a D-ring used with the mounting lugs of the main tractor wheel.

Affixed to some of the lugs 22, and preferably at least half of the lugs, are a plurality of D-rings 38 (FIG. 7). The D-rings 38 include straight back portions 40 having lug openings 42 through which the lugs 22 extend when connecting the rim 18 and the hub 20. The D-rings 38 also include projecting rounded eye portions 44 extending outwardly beyond the heads of the lugs 22, toward the auxiliary wheel 14. When the D-rings 38 are assembled with the lugs 22, they remain a permanent part of the main wheel 12 and need never be removed unless the tire 16 and the rim 18 are removed from the hub 20.

Figure 4:
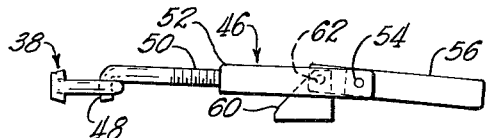
FIG. 4 is an enlarged side view in elevation of a connector for affixing the auxiliary traction wheel to the main wheel.
Figure 5:
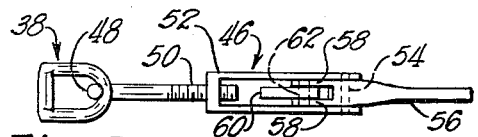
FIG. 5 is a top view of the connector shown in FIG. 4.
Figure 6:
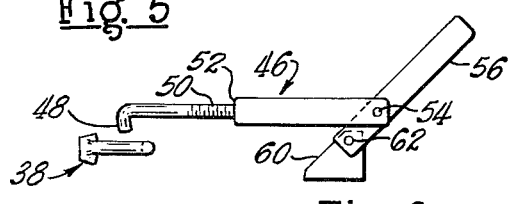
FIG. 6 is a side view in elevation of the connector in a release position.

A plurality of connectors 46 connect the wheels 12 and 14 in a matter of a few minutes. Each of the connectors 46 includes a hook 48 (FIGS. 4–6) which extends into the eye portion 44 of the D-ring 38 to effect the connection. The hook 48 has a threaded end 50 which is adjustably engaged in a threaded opening in a U-shaped link 52. The ends of the legs of the adjustable link 52 have openings therein to receive a pivot pin or rivet 54. The rivet 54 also extends through a pivot opening or passage in an intermediate part of a clamping lever 56. The lever 56 has a bifurcated end forming a pair of legs 58 which extend on each side of a bracket 60, with the bracket and the legs having appropriate pivot holes by means of which they are pivotally connected together by pivot members or pins 62. The bracket 60 is sufficiently high that a line through the portion of the hook 48 contacting the ring 38 and the pivot rivet 54 will pass below the pivot member 62 when the lever is in the engaged position shown in FIG. 4, with the end of the lever close to or in contact with the rim 30. In this manner, the force on the hook will urge the lever 56 further toward the engaged position.

The lever 56 can be moved by means of a pipe slipped over the end to provide as much leverage as required. The threaded end 50 of the hook 48 can be turned into and out of the link 52 to adjust the length of the connector 46. The clamping force must be sufficient to prevent the spacing band 32 from slipping relative to either one of the rims 18 and 30 since the torque exerted on the auxiliary wheel 14 is transferred substantially entirely through the band 32. Further, the force must be sufficient to prevent the lever 56 from being released when in its engaged position, by jarring, when the tractor is operated.

Figure 8:
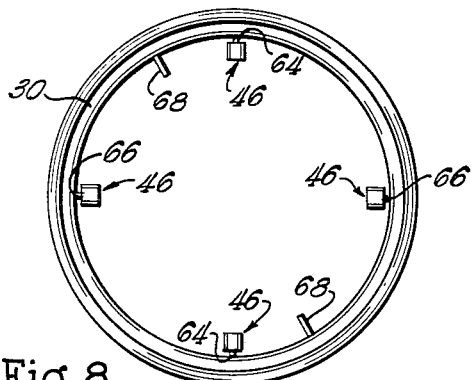
FIG. 8 is a schematic view in elevation of the auxiliary wheel with mounting means located in one position to accommodate one style of main wheel.
Figure 9:
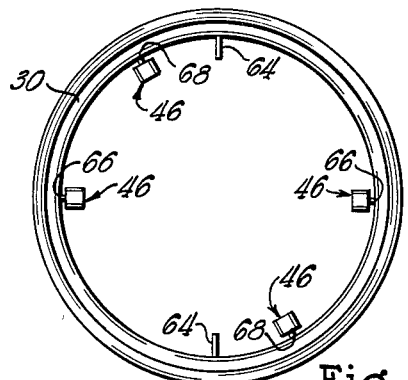
FIG. 9 is a view similar to FIG. 8 but with the mounting means in another position to accommodate another style of main wheel.

With the arrangement of FIGS. 8 and 9, the auxiliary wheel can be used with permanent wheels having either six or eight lugs. While four of the connectors 46 are employed for each of the auxiliary traction wheels 14, six of the brackets 60 are affixed to the rim 30. Of the six brackets 60 shown, a first pair 64 of diametrically opposed brackets lie on a line perpendicular to a line through a second pair 66 of the brackets. A third pair 68 of the brackets lie on a line at an angle of 60° to the line through either the pair 64 or the pair 66. With this arrangement, when a main tractor wheel employing eight lugs is used, the connectors 46 are mounted on the pairs 64 and 66 of the brackets (FIG. 8) so that the four connectors lie on mutually perpendicular lines. The four connectors 46 are then hooked to the D-rings 38 which are affixed to every other one of the lugs 22 and also lie on mutually perpendicular lines.

When the auxiliary wheel 14 is to be mounted on a main tractor wheel having only six lugs, two of the connectors 46 are moved from the pair 64 of brackets to the pair 68 of brackets (FIG. 9) with the connectors then hooked to D-rings mounted on two adjacent pairs of diametrically opposed lugs.

Figure 10:
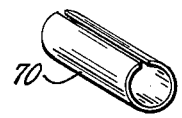
FIG. 10 is a view in perspective of a pivot member used to attach a connector to a rim bracket of the auxiliary wheel.

Because the connectors 46 mounted on the pair 66 of brackets are never moved, they can be mounted by means of permanent rivets constituting the pivot members 62. On the other hand, the connectors 46 which are mounted on either the pair 64 or the pair 68 of the brackets are detachably pivoted thereto by means of roll pins constituting the pivot members 62. Roll pins 70 shown in FIG. 10 each have a slit longitudinally thereof so that the pin can resiliently engage the lever legs 58 when assembled therewith to hold tightly and yet be removed when struck endwise by a hammer, for example. The pins thus hold the connector securely with respect to the bracket and yet enable the connector to be removed if necessary for transfer to another bracket. The link 52 prevents the pin 70 from falling out when the connector 46 is in the engaged position.

Various modifications of the above described embodiment of the invention will be apparent to those skilled in the art, and it is to be understood that such modifications can be made without departing from the scope of the invention, if they are within the spirit and the tenor of the accompanying claims.

I claim:

1. In combination with a tractor wheel comprising a tire, a first tire rim on which the tire is mounted, said rim having an offset portion, a hub, a drive axle affixed to said hub, and a plurality of lugs affixing said tire rim to said hub at a plurality of equally spaced points around the periphery of said hub, a plurality of D-rings having straight back portions and projecting eye portions with the back portions having openings therethrough receiving said lugs, a second tire rim, a second tire mounted on said second rim, a spacing band welded to said second rim and bearing against the offset portion of said first rim, a plurality of brackets with pivot holes welded to said second rim, each bracket being diametrically opposite another bracket to form a pair, a first pair of said brackets being on a line perpendicular to a line through a second pair of said brackets, and a third pair of said brackets being on a line making an angle of 60° with the line through said second pair of brackets, four connectors for four of said brackets, each of said connectors comprising a hook engaged with one of said D-rings and having a threaded end, a U-shaped link having a threaded opening at an end thereof to receive the threaded end of said hook, said link having a pair of pivot holes at the opposite end, a lever having a pair of legs extending on each side of the associated bracket, said bracket legs having a pair of aligned pivot holes therein which are aligned with the bracket pivot hole, said lever having an additional hole spaced from the leg pivot holes, a pivot pin connecting said link pivot holes and said lever additional hole, rivets connecting two of said levers through the lever pivot holes to the brackets of said second pair, and roll pins removably connecting the other two levers to either of said first and third pairs of said brackets.

2. An auxiliary traction wheel and mounting means for attaching the traction wheel to a tractor wheel comprising a tire, a rim on which the tire is mounted, a hub, and a plurality of lugs affixing said tire rim to said hub at a plurality of equally spaced points around the periphery of said hub, said traction wheel comprising a second tire rim and a second tire mounted on said second rim, said mounting means comprising a plurality of rings having back portions and projecting eye portions with the back portions having openings therethrough for receiving said lugs, a spacing band welded to said second rim and adapted to bear against a portion of said first rim, a plurality of brackets with pivot holes affixed to said second rim, each bracket being diametrically opposite another bracket to form a pair, a first pair of said brackets being on a line perpendicular to a line through a second pair of said brackets, and a third pair of said brackets lying on a line making an angle of 60° with the line through said second pair of brackets, four connectors for four of said brackets, each of said connectors comprising a hook adapted to engage one of said rings, a lever pivotally connected to the associated hook to latch said hook with the associated ring in an over-center position, means connecting two of said levers to the brackets of said second pair, and additional means removably connecting the other two levers to either of said other pairs of brackets whereby said traction wheel can be mounted with a tractor wheel having either six lugs or eight lugs.

3. An auxiliary traction wheel and mounting means for attaching the traction wheel to a tractor wheel comprising a tire, a rim on which the tire is mounted, a hub, and a plurality of lugs affixing said tire rim to said hub at a plurality of equally spaced points around the periphery of said hub, said traction wheel comprising a second tire rim and a second tire mounted on said second rim, said mounting means comprising a plurality of ring means affixed to said first rim, a spacing band located between said first and second rims, a plurality of brackets affixed to said second rim, each bracket being diametrically opposite another bracket to form a pair, a first pair of said brackets being on a line perpendicular to a line through a second pair of said brackets, and a third pair of said brackets lying on a line making an angle of 60° with the line through said second pair of brackets, four connectors for four of said brackets, each of said connectors comprising a hook adapted to engage one of said rings, latching means connected to the associated hook to latch said hook with the associated ring, means connecting two of said latching means to the brackets of said second pair, and additional means removably connecting the other two latching means to either of said first and third pairs of brackets whereby said traction wheel can be mounted with a tractor wheel having either six lugs or eight lugs by changing the other two latching means from one of said first and third pairs of brackets to the other.

4. For an auxiliary traction wheel for use with a main tractor wheel comprising a tire, a rim on which the tire is mounted, a hub, and a plurality of lugs for affixing the rim to the hub at a plurality of equally spaced points around the periphery of the hub, said auxiliary wheel including a second rim, a second tire mounted on the second rim, mounting means for attaching said auxiliary wheel to said tractor wheel comprising a cylindrical spacing band adapted to be positioned between said first and second rims when said main and auxiliary wheels are assembled, a plurality of D-rings having back portions and eye portions with said back portions receiving said lugs, said eye portions being affixed to said back portions at both ends, a plurality of brackets with pivot holes adapted to be welded to the second rim, connectors for said brackets, each of said connectors comprising a hook insertable in the space between the back portion and the eye portion of one of said rings and having a threaded end, a U-shaped link having a threaded opening receiving said threaded end of said hook and having pivot holes at the other end, a lever having a pivot hole at one end, said lever having an additional hole spaced from the pivot hole, pivot means connecting said link and said lever, and means connecting said pivot holes of said levers to said pivot holes of said brackets.

References Cited by the Examiner

UNITED STATES PATENTS

| 670,035 | 3/1901 | Sawyer | 85—32 |
| 1,876,720 | 9/1932 | Merrill | 85—32 |
| 2,683,051 | 7/1954 | Christophersen | 24—68 X |
| 2,920,370 | 1/1960 | Guy | 24—271 |
| 3,082,040 | 3/1963 | Degerness | 301—36 |

FOREIGN PATENTS

| 802,214 | 2/1951 | Germany. |

BENJAMIN HERSH, *Primary Examiner.*

ARTHUR L. LA POINT, *Examiner.*